Oct. 9, 1945.  A. E. DROBISH  2,386,545
ARTICLE HANDLING APPARATUS
Filed June 6, 1942  2 Sheets-Sheet 1
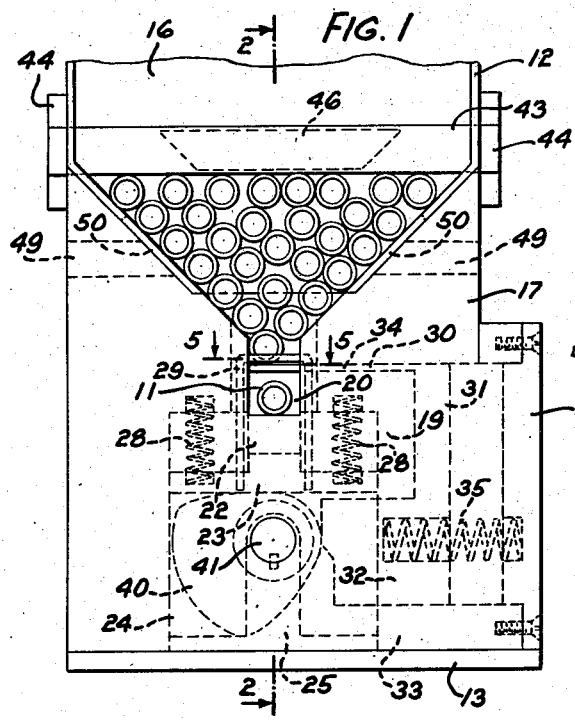
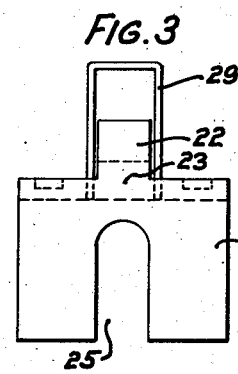
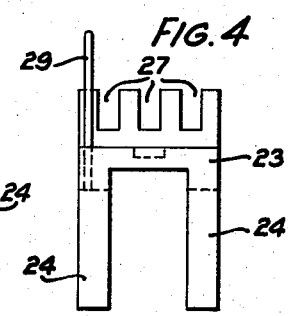
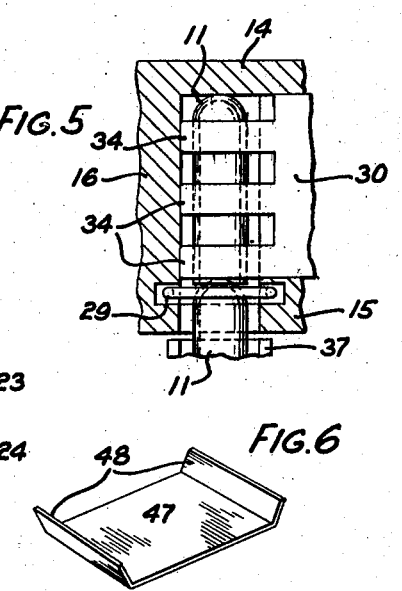
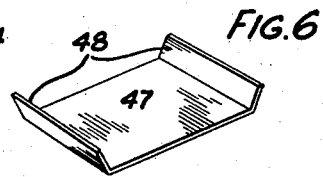
INVENTOR
A. E. DROBISH
BY Harry L. Duft
ATTORNEY Oct. 9, 1945.  A. E. DROBISH  2,386,545
ARTICLE HANDLING APPARATUS
Filed June 6, 1942  2 Sheets-Sheet 2
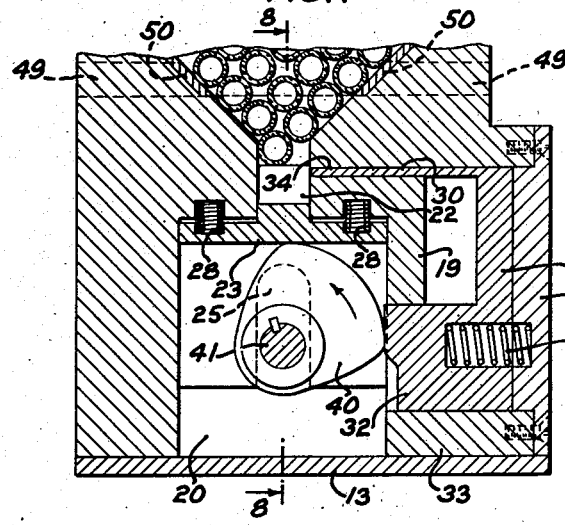
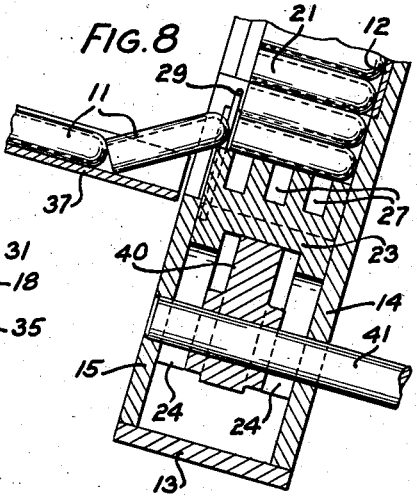
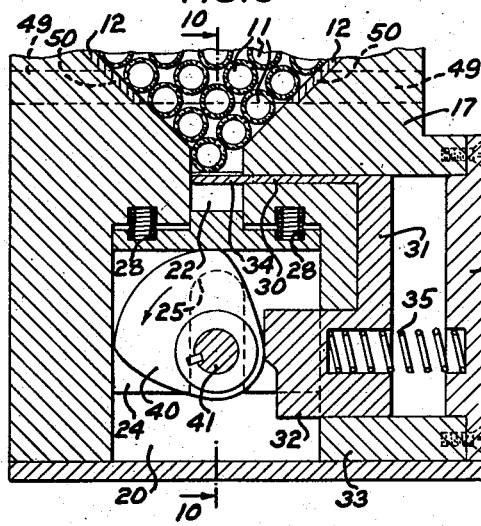
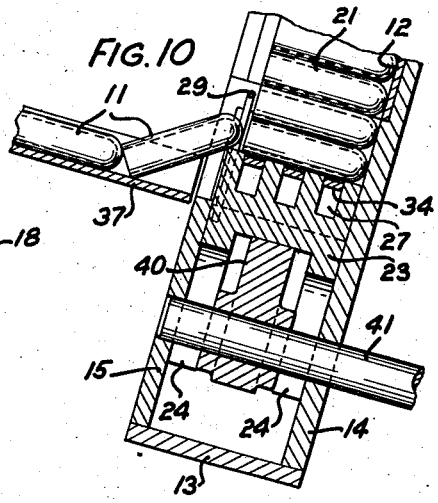
INVENTOR
A. E. DROBISH
BY
ATTORNEY Patented Oct. 9, 1945

2,386,545

UNITED STATES PATENT OFFICE 2,386,545

ARTICLE HANDLING APPARATUS

Adolph E. Drobish, Oak Park, Ill., assignor to Western Electric Company, Incorporated, New York, N. Y., a corporation of New York Application June 6, 1942, Serial No. 446,155

5 Claims. (Cl. 214—6)

This invention relates to article handling apparatus, and more particularly to an apparatus for stacking articles in a hopper.

In the manufacture of switchboard type lamps, blanks may be formed from lengths of glass tubing, placed in a hopper and the hopper placed on an apparatus which positions the filament and filament support in the bulb and then exhausts the air from the lamp. It is particularly desirable that the blanks be uniformly stacked in the hopper since the succeeding operations are largely automatic and unless the blanks are accurately stacked, jamming and breakage of the blanks may result. It may be desirable to provide automatic apparatus for stacking the blanks in the hopper rather than to have the bulbs stacked by hand. However, due to the fragility of the blanks and their relatively small size, considerable difficulties have been experienced in stacking of bulbs because of breakage and lack of uniformity in stacking.

It is an object of the present invention to provide a simple and efficient apparatus for stacking articles such as switchboard type lamp blanks in a hopper.

In accordance with one embodiment of this invention, an apparatus may be provided comprising a stacking device having a removable hopper positioned thereon and a chute for conveying blanks to be stacked to a reciprocating plunger which lifts the blanks into the hopper. A cooperating slide member for retaining the blanks in the hopper operates in timed relationship to the plunger and a weight may be provided to rest on the top of the blanks as they are stacked in the hopper to cause them to be positioned evenly therein.

Other objects and advantages of this invention will be apparent from the following detailed description taken in conjunction with the following drawings, wherein:

Fig. 1 is a fragmentary front elevation showing an article stacking apparatus;

Fig. 2 is a vertical section along the line 2—2 of Fig. 1;

Fig. 3 is a detail front view of the plunger assembly;

Fig. 4 is a detail side view of the plunger assembly;

Fig. 5 is an enlarged sectional view along the line 5—5 of Fig. 1;

Fig. 6 is a detail perspective view of the plate used to close the bottom of the hopper;

Fig. 7 is a transverse sectional view of the stacking apparatus, the plunger being in raised position;

Fig. 8 is a vertical section along the line 8—8 of Fig. 7;

Fig. 9 is a view similar to Fig. 7 showing, however, the retaining slide in retaining position beneath the hopper; and Fig. 10 is a vertical section along the line 10—10 of Fig. 9.

Referring to the drawings, and particularly to Figs. 1 and 2, an apparatus for stacking articles such as switchboard type lamp blanks 11 in a removable magazine or hopper 12 is shown. The housing for the stacking apparatus, which includes a support for the hopper, comprises a base 13 on which are mounted a rear plate 14 and an irregularly shaped front plate 15. A body member 16 is mounted at one side of the base and between the plates 14 and 15. Its upper portion together with a block 17 mounted at the upper end of a side plate 18, and between the plates 14 and 15, forms a V-shaped support for the removable hopper 12.

A small angularly shaped member 19 together with the lower portion of body member 16 forms a chamber 20 in which is positioned a cam reciprocated plunger 22. The plunger, shown in detail in Figs. 3 and 4, is mounted on a base 23. A pair of guide plates 24 mounted on the under side of the plunger base 23 and spaced to permit a cam 40 and cam slide 32 to move freely between them, extend downwardly from the base to serve as guides for the plunger assembly, slidably engaging the inner surface of the body member 16 and the member 19, as well as one side of block 33 which serves as a support for the cam slide. A slot 25 is provided in each plate 24 to permit the plates to move freely over a cam shaft 41.

As may be seen in Figs. 1, 7 and 9, a retaining slide 30 is mounted on the top of an upwardly extending portion 31 of the cam slide 32 and serves to retain blanks in the hopper when the plunger 22 is withdrawn. The portion of the retaining slide 30 which engages the blanks comprises a number of fingers 34, shown in Fig. 5, which, when in supporting position, may enter an equivalent number of slots 27 in the plunger 22. The relative movements of the plunger and the slide are timed so that the fingers of the slide are positioned in the slots before the blank engaging surface of the plunger, that is, the top of the plunger is below the level of the slide. Thus, the blanks are at all times supported at or above that level. This arrangement is particularly desirable with fragile articles such as glass lamp blanks because if the slide were not in retaining position underneath the blanks before the plunger moved downward below the level of the slide, as would be the case if the plunger were not slotted and the blank engaging portion of the slide designed to enter the slots, it would be difficult to insert the retaining slide without breaking the blanks.

As shown in Figs. 2, 8 and 10, in the operation of this apparatus, which is mounted at a slight angle from the vertical, a blank 11 is fed by gravity to the apparatus through a chute 37 and slides into position on the top of the plunger. The cam 40 is keyed to and supported by a rotating shaft 41, which is journalled in the plates 14 and 15 at the rear and front of the housing. In the course of a cycle of operation, the cam engages first the cam slide 32, moving it against a spring 35, one end of which is positioned at the rear of the block and the other end of which rests on the inner surface of the side plate 18. As the cam continues to be rotated, the fingers 34 of the retaining slide move out of the slots 27 in the plunger to permit a blank to be raised. At the same time the cam will have engaged the under side of the base 23 of the plunger and have begun to move the plunger and supported blank upward toward the opening in the bottom of the hopper and consequently above the level of the fingers of the slide, reaching the position shown in Figs. 7 and 8. It will be noted, as evident in Fig. 1, that the blank just elevated does not reach the hopper on that cycle of operation. However, as additional blanks are elevated, those previously elevated are positioned in the hopper, being elevated by the succeeding blanks, and the blanks in the hopper will be moved upwards a distance equivalent to the displacement of the blank just elevated.

It will be evident upon referring to Figs. 9 and 10 that when the plunger is raised to its maximum height, the projecting portion of the cam 40 will have ceased to engage the block 32. Thus, at this point the retaining fingers have been returned to their original position in the slots of the plunger by the spring 35. These figures show the retaining fingers in position beneath the blanks while the blanks are still supported by the plunger. As the cam completes its cycle of operation, however, the plunger is lowered substantially below the retaining fingers and returns to the starting position, as shown in Figs. 1 and 2, a pair of springs 28 urging the plunger downwards. The stack of blanks in the hopper and just below the opening in the hopper is then supported by the retaining fingers 34, as shown in Figs. 1 and 2.

As may be seen in Figs. 3 and 10, as the plunger is moved upwards, the next blank to be elevated, since its front end rests on the rear end of the blank on the plunger, will also be raised but since it is engaged only at one end, it will be raised at an angle to the plunger. In order to facilitate the return of this succeeding blank to the chute so that it may be positioned on the plunger, a hairpin-shaped member 29 is mounted on the front of the plunger, that is to say, the side from which the blanks are positioned on the plunger, and as the plunger returns to the starting position, the member 29 engages the raised end of the succeeding blank and pulls it down so that the blank slides on to the plunger, urged forward by the weight of the other blanks in the chute.

A pair of bars 43 joined at their ends by cross members 44 and positioned in slots 45 in the sides of the hopper and provided with a weight 46 rests on the top of the stck of blanks in the hopper and serve to keep the upper level of the stack uniform. As has been indicated, since the hopper and blanks are to be positioned on an automatic lamp-making machine, it is very desirable that the blanks be uniformly arranged in the hopper and unless such a levelling device is provided, the blanks might tend to pile up on one side of the hopper and then on reaching a certain height to rearrange themselves, as additional blanks were added, with consequent danger of breakage and lack of uniformity in position. The cross members 44 closely engage the sides of the hopper and since they are relatively long and move up and down the sides of the hopper, they tend to keep the bars substantially horizontal and parallel to the base 13.

After the hopper has been filled sufficiently with blanks, it is removed from the stacking apparatus and an empty hopper placed in position. In order to prevent blanks from falling out of the hopper, a flat plate 47, shown in Fig. 6, the ends of which are bent upwards at an angle so as to be able to engage the lower portion of the hopper, is inserted in the base of the hopper. It is necessary to raise the blanks in the hopper slightly to make room for the slide and therefore slots 49 are provided, as shown in Figs. 1, 7 and 9, in the hopper supporting blocks 16 and 17 so that a flat tool may be inserted in slots 50 in the sides of the hopper and used to raise the blanks. The plate 47 may then be inserted in the hopper with its upwardly bent sides 48 resting on the inner sides of the hopper. The tool is then withdrawn and the hopper removed from the stacking apparatus.

While but one embodiment of this invention has been shown and described, it will be understood that many modifications and alterations may be made therein without departing from the spirit or scope of the present invention.

What is claimed is:

1. In an apparatus for stacking articles in a hopper, a reciprocable plunger for elevating an article to the hopper, movable means for retaining said elevated article in said hopper, said plunger and said movable retaining means having cam surfaces spaced at an angularity of 90° and in the path of a single cam, and a cam associated with said plunger and said retaining means having a single camming surface for successively operating said plunger and said retaining means.

2. In an apparatus for stacking articles in a hopper, a reciprocable plunger for elevating an article to the hopper, movable means for retaining an elevated article in said hopper, said plunger and said movable retaining means having cam surfaces positioned at right angles to each other and in the path of a single cam, and a cam keyed to said shaft having a single cam surface for successively operating said plunger and said retaining means.

3. In an apparatus for stacking articles in a hopper having an opening in the lower portion thereof, a reciprocable retaining member slidably mounted beneath said hopper opening, a plunger movable transversely of said retaining member for elevating an article to said hopper, said plunger and said movable retaining means having cam engaging surfaces at an angularity of 90° and in the path of a single cam, a continuously rotating shaft, and a cam keyed to said shaft having a single camming surface for moving said retaining member away from said opening, said cam then elevating said plunger.

4. In an apparatus for stacking articles in a hopper having an opening in the lower portion thereof, a reciprocable retaining member slidably mounted beneath said hopper opening, a plunger for elevating an article to said hopper, said plunger and said reciprocatable retaining member having cam engaging surfaces positioned at an angularity of 90° and in the path of a single cam, a continuously rotating shaft, and a cam secured to said shaft having a single camming surface for moving said retaining member away from said opening, said cam then elevating said plunger, and returning said retaining member into position under said opening.

5. In an apparatus for stacking articles in a hopper, a plunger for raising an article to the hopper, a chute for supplying articles to said plunger, and a loop-shaped member carried by said plunger for repositioning an article following the elevated article on said chute.

ADOLPH E. DROBISH.